(12) United States Patent
Sakamoto et al.

(10) Patent No.: US 6,377,356 B2
(45) Date of Patent: *Apr. 23, 2002

(54) METHOD OF PRINTING ON BOTH SIDES OF SHEET WITHOUT USING A BOTH SIDE PRINTING MECHANISM AND AN APPARATUS FOR USE THEREWITH

(75) Inventors: Yoichi Sakamoto, Yokohama; Akihiro Shimura, Kawasaki, both of (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/061,877

(22) Filed: Apr. 17, 1998

Related U.S. Application Data

(62) Division of application No. 08/506,026, filed on Jul. 24, 1995, now Pat. No. 5,790,766.

(30) Foreign Application Priority Data

Jul. 25, 1994 (JP) .............................................. 6-192818

(51) Int. Cl.⁷ .............................................. G06K 15/00
(52) U.S. Cl. ..................................................... 358/1.14
(58) Field of Search ................................ 395/101, 104, 395/106, 109, 111, 113, 117; 399/18, 19, 20, 21, 81, 82, 361, 363, 364, 368, 369, 372, 373, 374, 401, 402; 358/296, 300; 347/153, 173, 174

(56) References Cited

U.S. PATENT DOCUMENTS

| | | | | |
|---|---|---|---|---|
| 4,200,386 A | * | 4/1980 | Queener | 399/403 |
| 4,330,197 A | * | 5/1982 | Smith et al. | 355/14 |
| 4,453,841 A | * | 6/1984 | Bobick et al. | 347/16 |
| 4,918,490 A | * | 4/1990 | Stemmle | 399/401 |
| 4,949,949 A | * | 8/1990 | Holmes et al. | 271/3.03 |
| 4,990,941 A | | 2/1991 | Kawai | 347/153 |
| 5,049,931 A | | 9/1991 | Knodt | 399/81 |
| 5,095,342 A | | 3/1992 | Farrell et al. | 399/401 |
| 5,095,369 A | | 3/1992 | Ortiz et al. | 358/296 |
| 5,095,371 A | | 3/1992 | Tanaka et al. | 358/300 |
| 5,159,395 A | | 10/1992 | Farrell et al. | 399/401 |
| 5,418,607 A | | 5/1995 | Tani | 399/364 |
| 5,504,568 A | | 4/1996 | Saraswat et al. | 399/364 |
| 5,517,295 A | | 5/1996 | Kaneko et al. | 399/373 |
| 5,790,766 A | * | 8/1998 | Sakamoto et al. | 395/113 |

OTHER PUBLICATIONS

IBM Manual, Series III Copier/Duplicator, Model 70, First Edition (Sep. 1985).

\* cited by examiner

*Primary Examiner*—Gabriel I. Garcia
(74) *Attorney, Agent, or Firm*—Fitzpatrick, Cella, Harper & Scinto

(57) ABSTRACT

A printing control method causes a printer to print data of even pages on one side of respective recording media, thereafter causes the printer to print data of odd pages, except for the last page if it is an odd page, on the other side of the recording medium, on one side of which the data of the even pages were printed and which were manually set in the sheet feeding device by an operator, and thereafter causing the printer to print data of the last page on a recording medium different from the recording media, on one side of which the data of even pages are printed and which were manually set in the sheet feeding device by the operator, if the last page is an odd page.

12 Claims, 14 Drawing Sheets

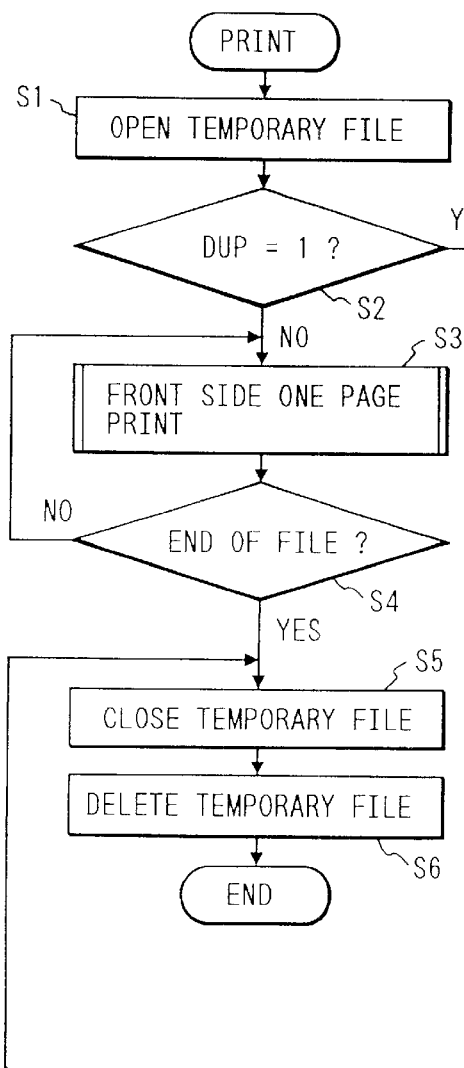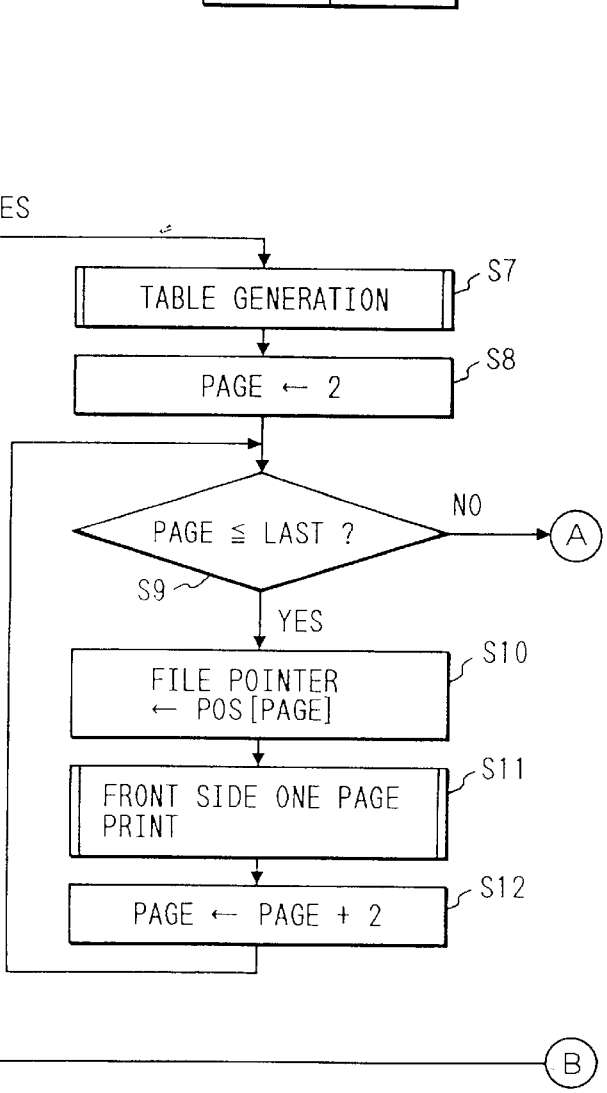
FIG. 9A
FIG. 9
| FIG. 9A | FIG. 9B |

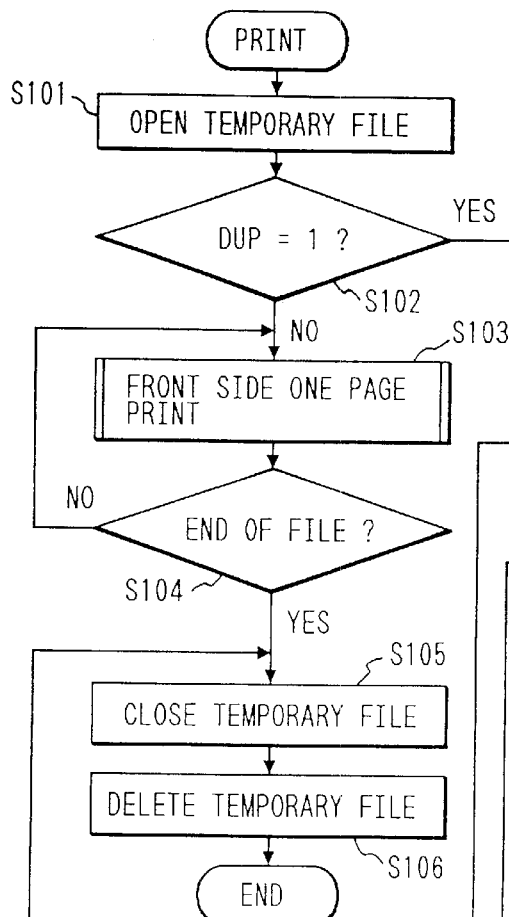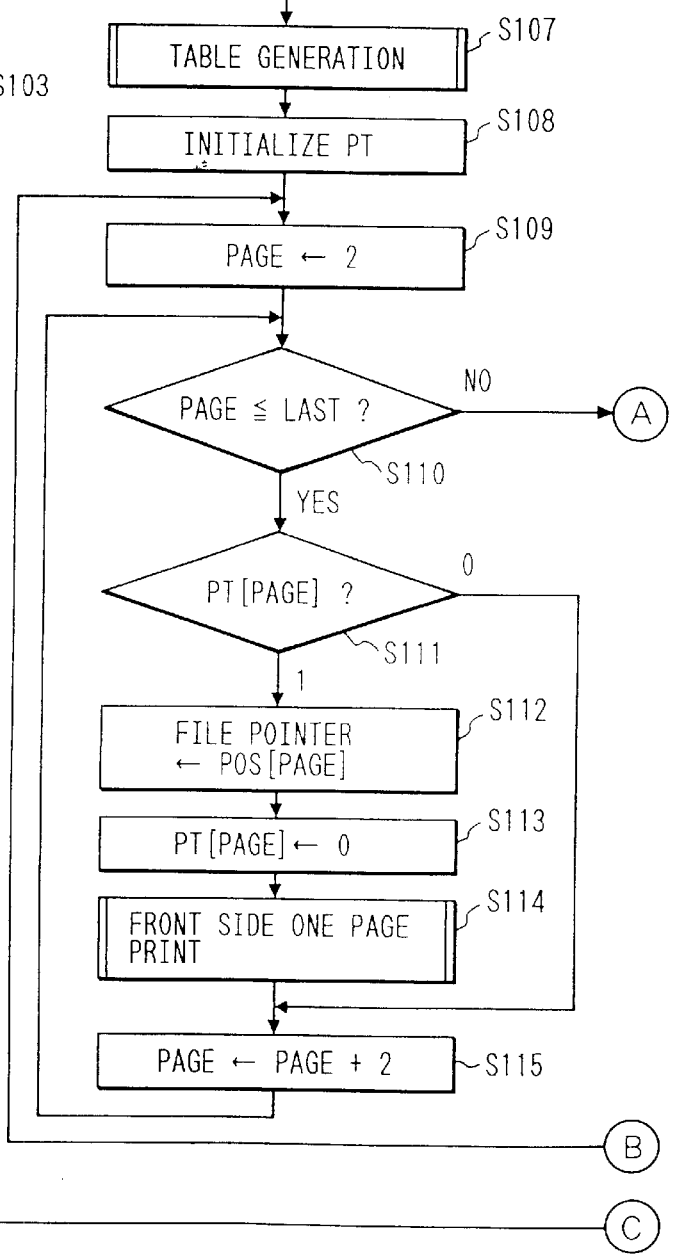
FIG. 15A
FIG. 15
| FIG. 15A | FIG. 15B |

METHOD OF PRINTING ON BOTH SIDES OF SHEET WITHOUT USING A BOTH SIDE PRINTING MECHANISM AND AN APPARATUS FOR USE THEREWITH

This is a divisional application of U.S. Patent Application No. 08/506,026 filed Jul. 24, 1995, and now U.S. Pat. No. 5,790,766, issued Aug. 4, 1998.

BACKGROUND OF THE INVENTION

1. Field of the Invention

The present invention relates to a method of printing on both sides of sheet without using a both side printing mechanism and an apparatus for use therewith.

2. Related Background Art

In order to perform the both side printing with an image output device, the printing of odd pages and the printing of even pages are separately performed. Namely, there is a method (so-called a manual both side printing) in which the printing of odd (or even) page is first performed on one side of a sheet, the operator reverses the sheet of one side printed paper and sets it on a sheet supply cassette of a printer, and subsequently the printing of even number (or odd number) page is performed on the other side of the sheet. Also, another method to obtain the both side recorded matter involves using a printer with a both side printing mechanism (e.g., a sheet reversing mechanism).

However, with the above conventional method, a both side printing mechanism such as a sheet reversing mechanism for printing the back side after printing the front side is needed, and to effect an appropriate recovery from the paper jam, it is necessary to hold data of the front and back sides in a memory inside the printer, which requires a larger capacity of memory than normally used. Therefore, there is a drawback that the apparatus is more expensive.

Also, in the above former method, after printing one face of sheet, if the paper jam occurs in printing the other side, the recovery from the paper jam can not be appropriately performed since the data printed on one face of jammed paper can not be reproduced.

SUMMARY OF THE INVENTION

It is an object of the present invention to provide an image output method and an apparatus for use therewith which is capable of readily effecting an appropriate recovery from the paper jam in the both side printing, using a printer without having a both side printing mechanism.

To accomplish the above object, the present invention is characterized by comprising memory means for storing print data, paper jam detecting means for detecting an occurrence of paper jam in a printer, print end detecting means for detecting that the printing of one page is ended in the printer, page location detecting means for detecting the location in the memory means for each page of print data stored in the memory means, selective page printing means for selectively outputting print data stored in the memory means to the printer in a unit of page, printing page instructing means for classifying the pages of print data stored in the memory means into two groups of front and back, and instructing the selective page printing means to output data of each group to the printer, and paper jam recovery means for instructing the selective page printing means to output print data of at least one side of a sheet where paper jam has occurred to the printer, when paper jam is detected by the paper jam detecting means.

To accomplish the above object, the present invention is characterized by further comprising paper jam detecting means for detecting an occurrence of paper jam in a printer, page location detecting means for detecting the location in the memory means for each page of print data stored in the memory means, selective page printing means for selectively outputting print data stored in the memory means to the printer in a unit of page, printing page instructing means for classifying the pages of print data stored in the memory means into two groups of front and back, and instructing the selective page printing means to output data of each group to the printer, paper jam page number input means for inputting the page number at which paper jam has occurred, and paper jam recovery means for instructing the selective page printing means to output print data of at least one side of a sheet corresponding to the page number to the printer, as well as receiving the page number from the paper jam page number input means, when paper jam is detected by the paper jam detecting means.

BRIEF DESCRIPTION OF THE DRAWINGS

FIGS. 9A and 9B are flowcharts for explaining a program of the same example.

FIGS. 15A and 15B are flowcharts for explaining a program of the same example.

DETAILED DESCRIPTION OF THE PREFERRED EMBODIMENTS

The preferred embodiments of the present invention will be described below with reference to the drawings.

Example 1

Figure 1:
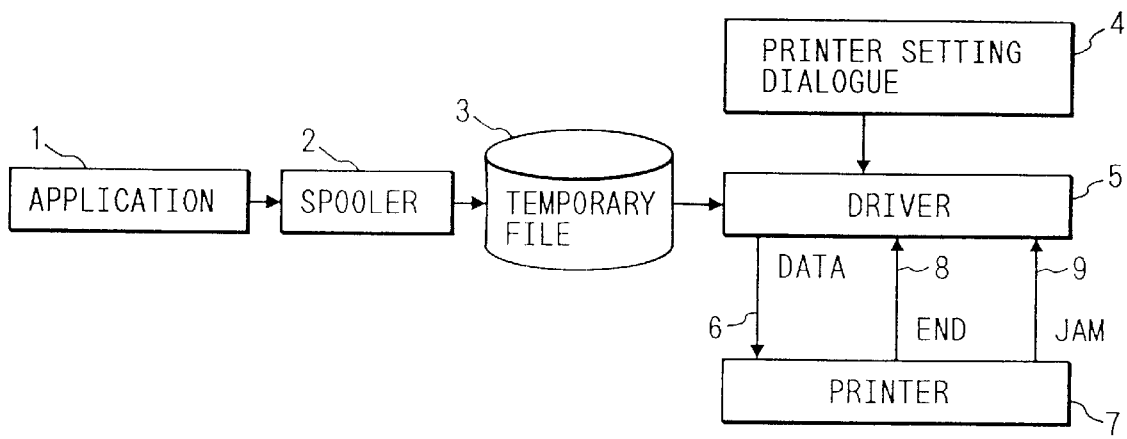
FIG. 1 is a block diagram showing the functional configuration of an output device according to a first example of the present invention.

FIG. 1 is a block diagram for explaining the functional configuration of an image output device according to an example of the present invention. In the figure, 1 is an application such as a word processor or a table calculation, which produces print data by converting the document or table data into print data.

2 is a spooler for storing print data produced by the application 1 in a temporary file 3. The temporary file 3 stores print data output from the spooler 2. A printer setting dialog 4 designates the both side print. A driver 5 outputs a DATA signal 6 as print data input from the temporary file 3 to a printer 7, and upon receiving an END signal 8 and a JAM signal 9 from the printer 7, performs a respective predetermined processing. Also, when the both side print is designated by the printer setting dialog 4, the both side printing process is performed.

The DATA signal 6 is print data output from the driver 5 which is passed to the printer 7. The printer 7 is a page printer such as a laser beam printer, for printing each page by receiving print data (DATA signal 6) which the driver 5 outputs. If the printing of one page is completed, the printer 7 outputs an END signal 8. Also, when paper jam occurs during printing, a JAM signal 9 is issued.

Figure 2:
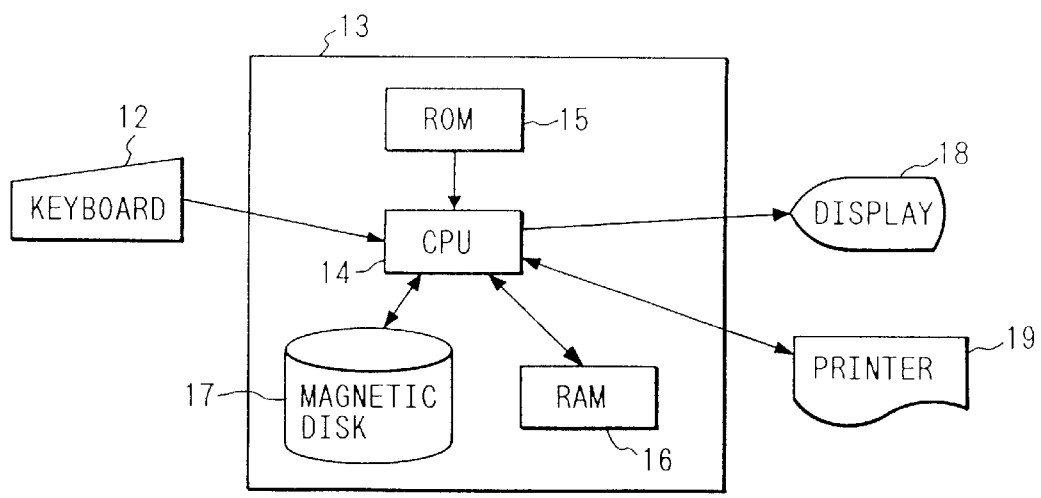
FIG. 2 is a block diagram showing the specific configuration of the same example.

FIG. 2 is a block diagram showing the specific configuration of this example. In the figure, 12 is a keyboard for delivering a key code to a CPU 14 upon the depression of a key. 13 is a host computer containing a CPU (Central Processing Unit) 14, a ROM (Read Only Memory) 15, a RAM (Random Access Memory) 16, and a magnetic disk 17. The CPU 14 is connected to the keyboard 12, the ROM 15, the RAM 16, the magnetic disk 17, a display unit 18, and a printer 19 (corresponding to the printer 7 in FIG. 1). The CPU 14 controls the whole of the image output device in accordance with a program memorized in the ROM 15, or a program temporarily memorized in the RAM 16.

The ROM 15 memorizes the programs to be executed by the CPU 14. The RAM memorizes temporarily a program which is stored in the magnetic disk 16. The RAM 16 memorizes data such as a document or a table which the application 1 processes and the working variables necessary for the execution of program memorized in the ROM 15 or RAM 16.

The magnetic disk 17 stores the program codes for the application 1, the spooler 2, the printer setting dialog 4, the driver 5, and an operating system (not shown), which the computer can read. These program codes may be loaded from a floppy disk or a CD-ROM to the magnetic disk 17. The magnetic disk 17 also stores the character fonts for use in the display on the display unit 18 or the printing with the printer 19. The magnetic disk 17 also stores a temporary file 3 as will be described later. The display unit 18 makes the display in accordance with a program of the CPU 14.

Figure 18:
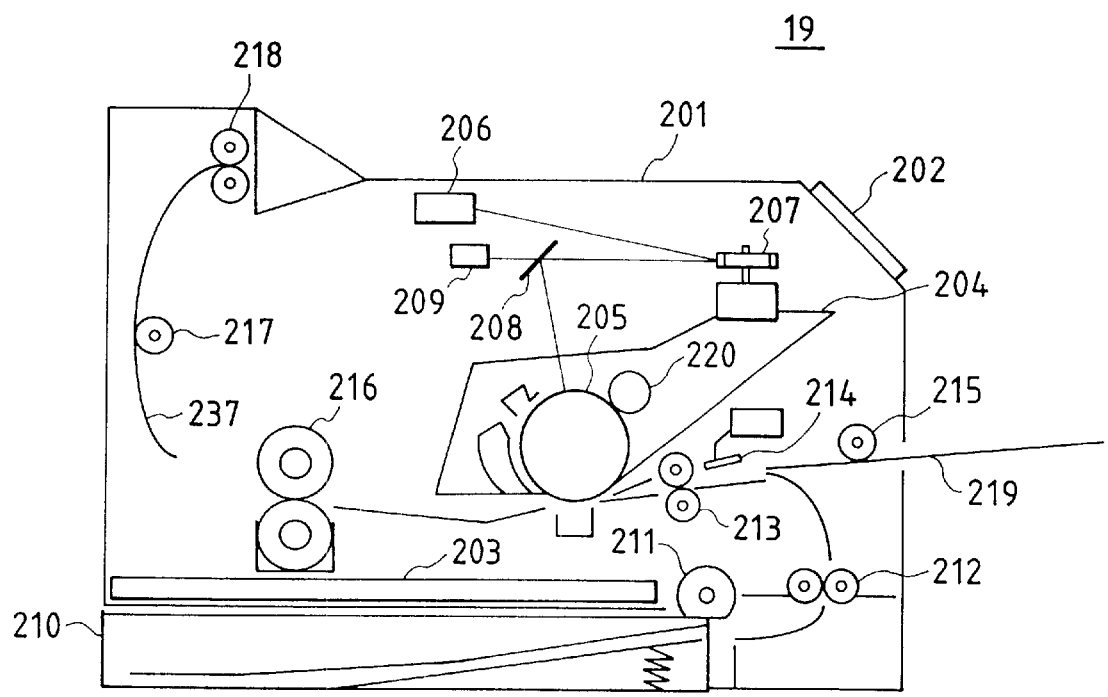
FIG. 18 is a view illustrating a printer to which this example is applicable.

FIG. 18 is a typical mechanical view illustrating the printer 19. In the same figure, 201 is a printer housing, and 202 is an operation panel. The operation panel 202 has a switch for the operation and an LED display. 203 is an accommodating portion of a control board for effecting the print process control for the printer. 210 is a paper cassette for storing the sheets, having a mechanism for electrically sensing the paper size by means of a diaphragm, not shown. 211 is a cassette paper supply clutch, consisting of a cam for separating the most upper one of the sheets laid on the paper cassette 210, to allow the separated sheet to be transported to a paper supply roller 212 by driving means, not shown, which is intermittently rotated every time of the paper supply to supply one sheet at each rotation. 214 is a resist shutter for registrating the sheet to stop the supply of sheet. The paper supply roller 212 brings the leading end of sheet to the resist shutter 214. 219 is a manual insertion tray and 215 is a manual insertion paper supply roller. The paper supply roller 215 separates the most upper one of the sheets when a plurality of sheets are laid in the manual insertion tray 219, and brings the leading end of sheet to the registration shutter 214. With the above constitution, a sheet can be selectively supplied from either the paper cassette 210 or the manual insertion paper supply tray 219.

The printer 19 determines paper supply means from among the cassette and the manual insertion tray 219, upon an instruction from the host computer 13, which then starts the paper supply as above described, upon a print start instruction, to convey the sheet to the registration shutter 214. 204 is a cartridge having a photosensitive drum 205 and a toner holder, not shown. 206 is a laser driver, 207 is a rotational polygon mirror, 208 is a reflection mirror, and 209 is a beam detector. If the sheet is conveyed to the registration shutter 214, the laser driver effects the on/off driving of a semiconductor laser, not shown, in accordance with print data sent from the host computer 13. A laser beam emitted from this semiconductor laser is scanned in a main scan direction by the rotational polygon mirror 207, and led via the reflection mirror onto the photosensitive drum 205, where it is imaged to form a latent image on the main scan line by the scanning in the main scan direction. The registration shutter 214 is driven upward synchronously with the emission of laser beam, to synchronize the conveyance of the sheet with the sub-scanning of the laser beam. The beam detector 209 provided in place in starting the scanning of the laser beam forms a synchronizing signal for determining the timing for writing out image in the main scan direction by detecting the laser beam. Thereafter, the sheet is conveyed by a conveying roller 213, the photosensitive drum is driven for rotation by a motor, not shown, to visualize data as a toner image by a developing unit 220, which toner image is transferred onto the sheet. The sheet to which the toner image is transferred, after the toner image is heated and fixed by a fixing roller 216, is then passed via the conveying roller 217 and exhausted into a paper exhausting tray of the printer housing by a paper exhausting roller 218.

As will be clear from FIG. 18, there is not provided a both side printing mechanism such as a mechanism for reversing the sheet in the printer 19.

Next, the outline of a printing procedure in this example will be described. If the application 1 accepts an instruction for printing, data such as, e.g., a document or table which the application 1 processes is converted into a page description language which is a print command for the printer 19, which is then sent to the spooler 2.

The spooler 2 creates a temporary file 3 in the magnetic disk 17 for storing the page description language sent from the application 1. The spooler 2 initiates the driver 5, if the page description language sent from the application 1 has been totally stored.

Figure 3:
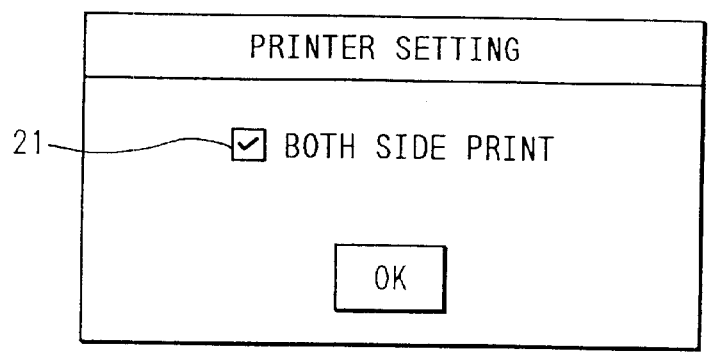
FIG. 3 is a view showing a display screen of the same example.

If the printer setting dialog 4 is initiated, a screen as shown in FIG. 3 appears on the display unit 18. In the figure, 21 is a check mark, which is indicated by the printer setting dialog 4, when the both side printing is effectively set. If the printer setting dialog 4 is initiated, and the screen as shown in FIG. 3 appears, the effective state of both side print is toggled every time a space key is entered from the keyboard 12. If a line feed key is entered from the keyboard 12, the printer setting dialog 4 terminates the processing, the effective state of both side printing finally set is memorized into the working variable contained in the RAM 16.

If the driver 5 is initiated by the spooler 2, the single side print or the both side print is performed in accordance with the effective state of both side print preset by the printer setting dialog 4. If the both side print is set to be ineffective, the driver 5 sends a page description language stored in the temporary file 3 as the DATA signal 6 to the printer 7. If data corresponding to one page has been sent, it waits for an END signal 8 to be received. If the END signal 8 is received, the driver 5 sends data corresponding to the next one page, and also waits for an END signal 8 to be received. In this way, the processing continues until the page description language stored in the temporary file 3 has been totally sent, then the temporary file 3 is deleted and the processing is ended.

Figure 4:
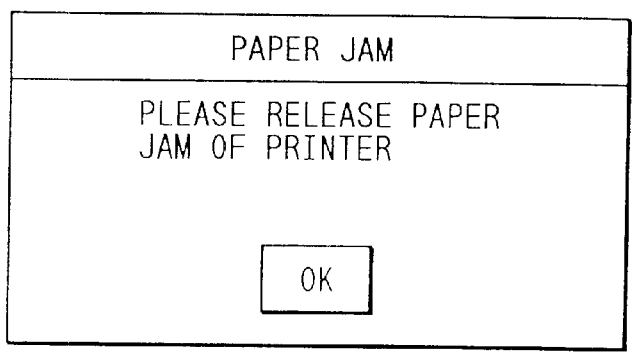
FIG. 4 is a view showing a display screen of the same example.

When a JAM signal 9 is received, the driver 5 displays a screen as shown in FIG. 4, and prompts the operator to release the paper jam. If the operator releases the paper jam and enters a line feed key, the driver resends the data corresponding to a page where the paper jam has occurred. It should be noted that the printer 7 is configured to hold no data for the page where the paper jam has occurred. The driver 5 makes the recovery of paper jam in this way, and then continues the processing in the same manner as if no paper jam occurs.

Figure 5:
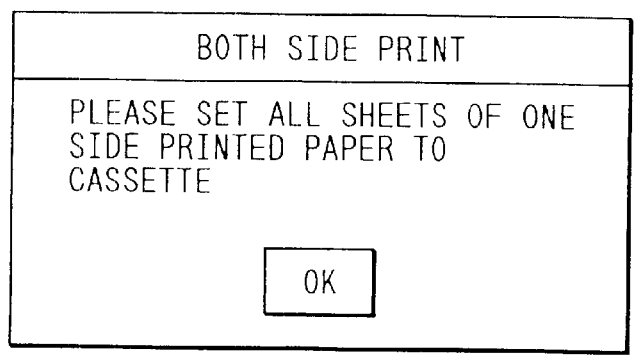
FIG. 5 is a view showing a display screen of the same example.
Figure 6:
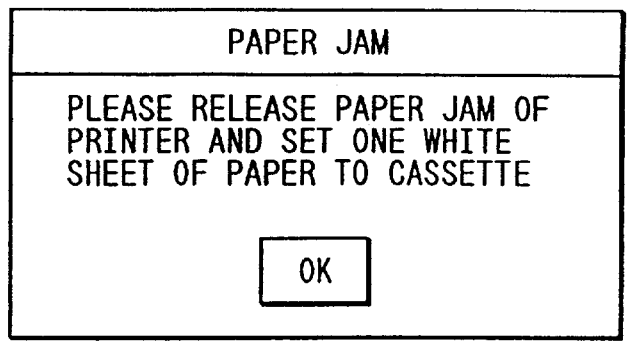
FIG. 6 is a view showing a display screen of the same example.

When the both side print is effectively set, the driver 5 sends only data corresponding to the even page to the printer 7 in accordance with the same procedure as the single side print as above described. If a JAM signal 9 is received during printing of the even page, the processing is performed in accordance with the same procedure as the single side print as above described. If all the printing for the even page is completed, the driver 5 displays a screen as shown in FIG. 5. If the operator sets the sheets of one side printed paper for the even page to the cassette of the printer 7 upon an instruction of the screen, and enters a line feed key, the driver 5 sends only data corresponding to the odd page to the printer 7. If the JAM signal 9 is received during printing of the odd page, a processing that is different from that of the single side print as above described is performed. If the JAM signal is received after the transmission of data corresponding to one page, the driver 5 displays a screen as shown in FIG. 6.

Figure 7:
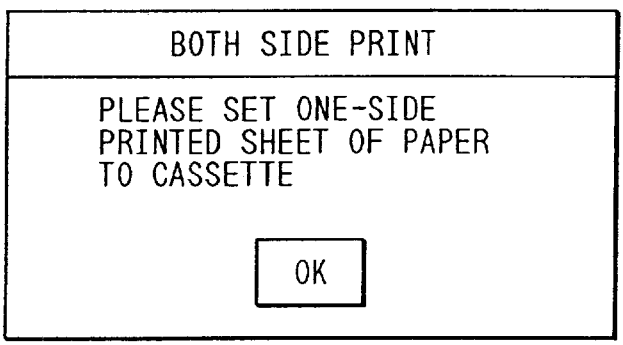
FIG. 7 is a view showing a display screen of the same example.

If the operator releases the paper jam, sets a clean sheet of paper to the cassette, and enters a line feed key, the driver 5 sends data corresponding to the even page of a sheet where the paper jam has occurred to the printer 7 in accordance with the same procedure as the single side print as above described. If the printing of one page is ended, the driver 5 displays a screen as shown in FIG. 7. If the operator sets in the cassette the sheet of even page printed paper where the paper jam has occurred upon an indication on the screen, and enters a line feed key, the driver starts the transmission of data corresponding to the odd page of the sheet where the paper jam has occurred. Thereafter, the same processing as if no paper jam occurs is continued.

Where the total number of pages is 5, for example, the number of odd pages is one page greater than that of even pages. In this case, the driver 5 does not print a page following the last page, and prints only two pages, for example, the second and fourth pages. In printing the odd page, the first and third pages are printed on the sheets where the second and fourth page have been printed on the back side, and the fifth page is printed on a clean sheet of paper lying underneath. The driver 5 sends data in accordance with the procedure of the single side print as above described, if the last page is an odd page.

Figure 8:
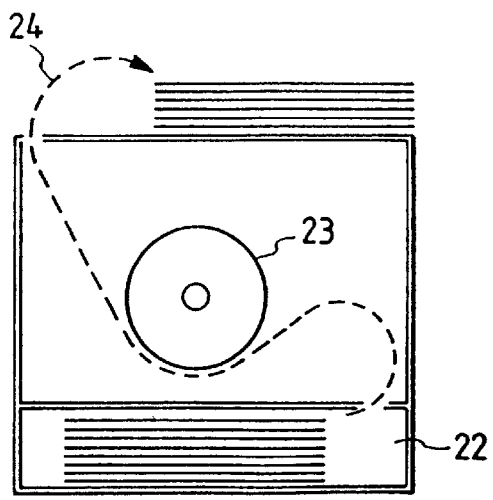
FIG. 8 is a view showing the sheet path of printer in the same example.

It is to be noted that the printer 7 has a sheet path 24, as shown in FIG. 8 in this example, to print on the lower face of sheet within the cassette 2, the sheet being exhausted with the printed side downward. Therefore, by printing both the even page and the odd page in ascending order during the both side printing, the print output ordered in correct page sequence can be obtained. In the figure, 22 is a cassette (corresponding to 210 in FIG. 18), 23 is a photosensitive drum (corresponding to 205 in FIG. 18), and 24 is a sheet path.

Next, a program for the driver 5 will be described in detail with reference to the flowchart. It is noted in the following description that a both side print register DUP, a page number register PAGE, a page position table POS, a last page number register LAST, and page head registers HEAD1 and HEAD2 are arranged on the RAM 16.

Figure 9B:
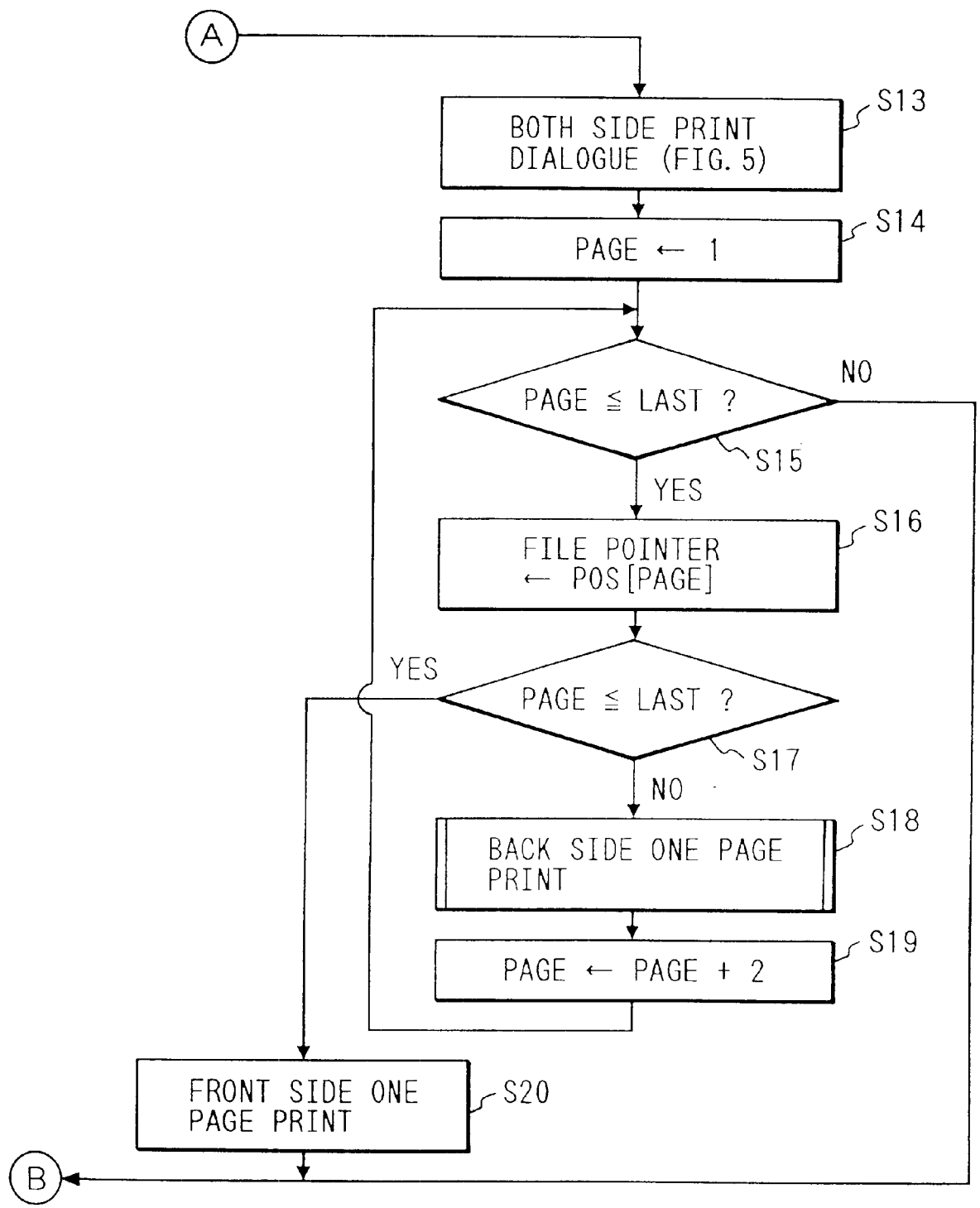

FIGS. 9A and 9B are flowcharts showing the overall printing process for the driver 5. If the driver 5 is driver 5 is initiated, the temporary file 3 is opened at step S1, and the both side print register DUM is examined at step S2. If the both side print is set ineffective, the both side print register DUP has been set to 0 by the print setting dialog 4, and the operation proceeds to the printing process of one page on only one side (hereinafter referred to as a front side one page printing process) at step S3. At step S3, the page description language stored in the temporary file 3 is read and data of one page is output to the printer 7, as will be described later. If the printing of one page is ended, a check is made to see whether or not the temporary file 3 reaches the end of file at step S4. If the end of file is not reached, the operation returns to step S3 to print the next one page. In this way, if the printing of all the pages is completed, the operation proceeds from step S4 to step S5 to close the temporary file 3, because the temporary file 3 reaches the end of file. At step S6, the temporary file 3 is deleted, and the processing is ended.

If the both side print is set to be effective, the both side print register DUP is set to 1 by the print setting dialog 4, and the operation proceeds from step S2 to step S7, where all the page description language stored in the temporary file 3 is read and the file location corresponding to the top of each page is recorded in the page position table POS, as will be described later. The page position table POS is of an arrangement indexed by the page number, and if the page number is PAGE, the file pointer stored is represented as a POS[PAGE]. At step S7, the last page number is stored in the last page number register LAST.

Then, at step S8, "2" is stored into the page number register PAGE. Then, at step S9, the page number register PAGE and the last page number register LAST are compared. If PAGE≦LAST, the printing of even page is not ended, and therefore the operation proceeds to step S10, where the file pointer of the temporary file 3 is set to POS[PAGE], that is, the file location corresponding to the top of page corresponding to the page number PAGE stored in the page position table POS. Thereby, the subsequent reading from the temporary file 3 occurs in sequence from the set file pointer.

Then, the operation proceeds to the front side one page print (hereinafter described) at step S11 to output data of one page to the printer 7. If the printing of one page is ended, "2" is added to the page number register PAGE at step S12, and the operation returns to step S9. In this way, if all the printing of even page is ended, PAGE>LAST results, and the operation proceeds from step S9 to step S13 to display a dialog as shown in FIG. 5. If a line feed key is entered "1" is stored in the page number register PAGE at step S14.

Then, at step S15, the page number register PAGE and the last page number register LAST are compared. If PAGE≦LAST, the printing of odd page is not ended, and therefore the operation proceeds to step S16, where the file pointer of the temporary file 3 is set to POST[PAGE].

Then, at step S17, the page number register PAGE and the last page number register LAST are compared. If PAGE≠LAST, the page is not last, and therefore the operation proceeds to the printing process for other side one page (hereinafter referred to as a back side one page printing process) at step S18, as will be described later, to output data of one page to the printer 7. If the printing of one page is ended, "2" is added to the page number register PAGE at step S19, and the operation returns to step S15.

In this way, the printing of odd page is repeated. If the number of pages is even, the operation proceeds from step S15 to step S5, after printing of the last page. If the number of pages is odd, PAGE=LAST occurs at step S17, immediately before the last page, and therefore the operation proceeds to the front side one page printing at step S20 to print the last page, and proceeds to step S5.

Figure 10:
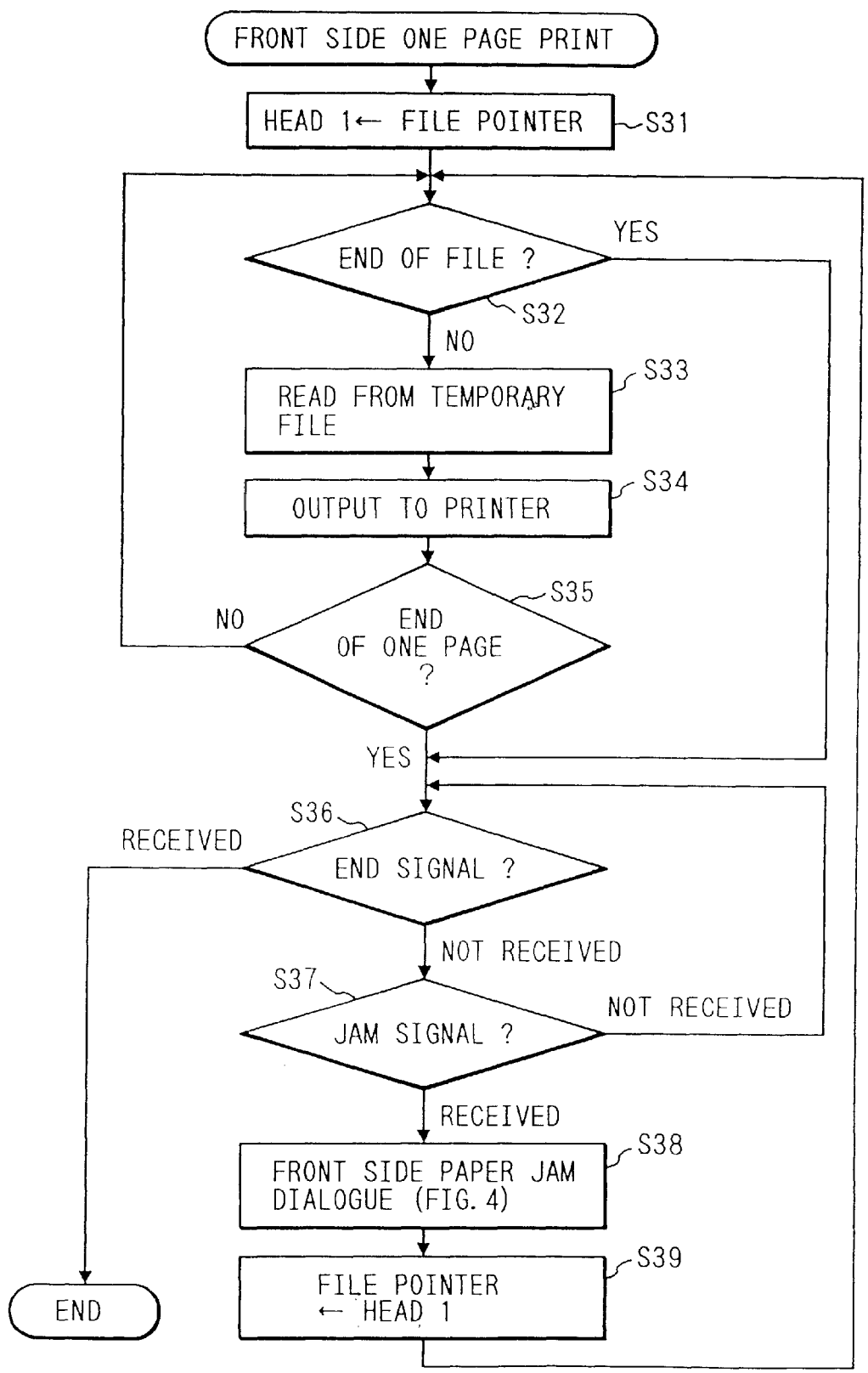
FIG. 10 is a flowchart for explaining a program of the same example.

FIG. 10 is a flowchart showing the details of front side one page printing process at steps S3, S11, and S20 in FIGS. 9A and 9B. If the front side one page printing process is called, the current value of the file pointer for the temporary file 3 is first stored in the page head register HEAD1 at step S31. Then, at step S32, a check is made to see whether or not the temporary file 3 reaches the end of file. If the end of file is not reached, the page description language stored is read from the temporary file 3 at step S33, and data is sent with the DATA signal 6 to the printer 7 at step S34.

Then, at step S35, the end of one page is checked. Since the data read from the temporary file 3 is the page description language in this example, it can be readily checked by analyzing the page description language which has been read in. If the end of one page is not true, the operation returns to step S32 to continue the processing. If the end of one page is true and the end of file is reached at step S32, the operation proceeds to step S36 to wait for the end of print.

If an END signal 8 is received at step S36, the processing is ended since the printing has been ended. If the END signal 8 is not received, the operation proceeds to step S37. If a JAM signal 9 is not received, the operation returns to step S36 to wait for the END signal 8 or JAM signal 9 to be received.

If the JAM signal 9 is received at step S37, a dialog as shown in FIG. 4 is displayed at step S38. If a line feed key is entered, the operation proceeds to step S39, where the file location stored in the page head register HEAD1 at step S31, that is, the head position of a page currently being printed is set to the file pointer of the temporary file 3.

Then, the operation returns to step S32 to send data of the page currently being printed to the printer 7 again. It is noted that since the printer 7 holds no data of a page where the paper jam has occurred, as previously described, it is necessary to send the data again.

Figure 11:
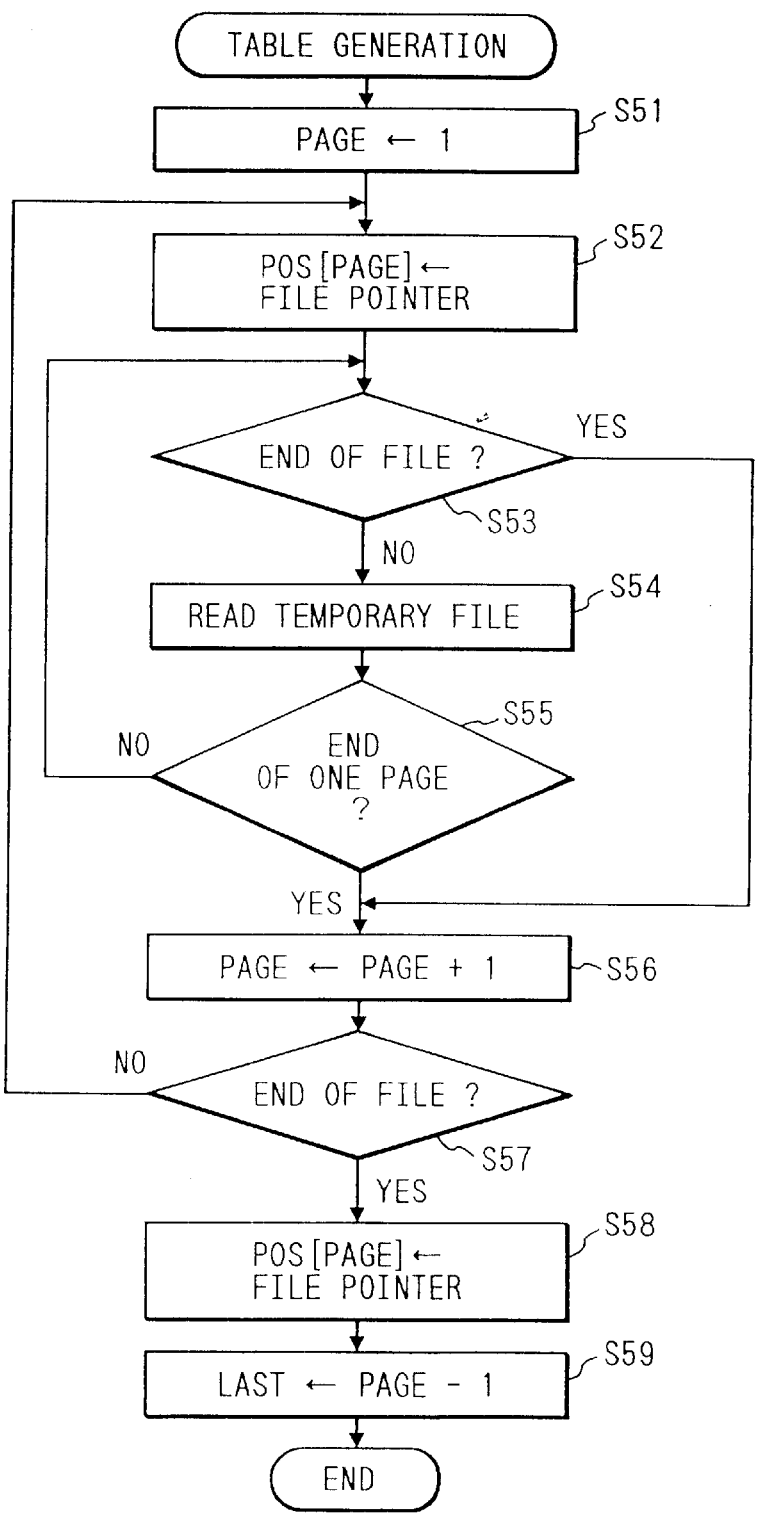
FIG. 11 is a flowchart for explaining a program of the same example.

FIG. 11 is a flowchart showing the details of a table generation process at step S7 as shown in FIG. 9. If the table generation process is called, "1" is stored in the page number register PAGE at step S51. Then, the operation proceeds to step S52, where the current value of the file pointer for the temporary file 3 or the top position of the page is stored in the page position table POS[PAGE]. Then, at step S53, a check is made to determine whether or not the temporary file 3 reaches the end of file. If the end of file is not reached, the page description language stored is read from the temporary file 3 at step S54, and the end of one page is checked at step S55.

This check is performed in the same manner as that at step S35 as shown in FIG. 10. If the end of one page is not true, the operation returns to step S53 to continue the processing. If the end of one page is true and the end of file is reached at step S53, the operation proceeds to step S56, where "1" is added to the page number register PAGE. Then, at step S57, a check is made to determine whether or not the temporary file 3 reaches the end of file. If the end of file is not reached, the operation returns to step S52 for further processing of the next page. If the end of file is reached, the current value of the file pointer for the temporary file 3 is stored in the page position table POS[PAGE] at step S58. This corresponds to the last location of data in the last page.

Then, at step S59, the page number register PAGE minus "1", i.e., the last page number, is stored in the last page number register LAST, and the processing is ended. It is noted that if the data stored in the temporary file 3 is empty in the above program. "1" is stored in the last page number register LAST. It is correct that "0" is stored, but since empty data is not stored by the spooler 2 in this example, this situation (empty data) will not occur.

Figure 12:
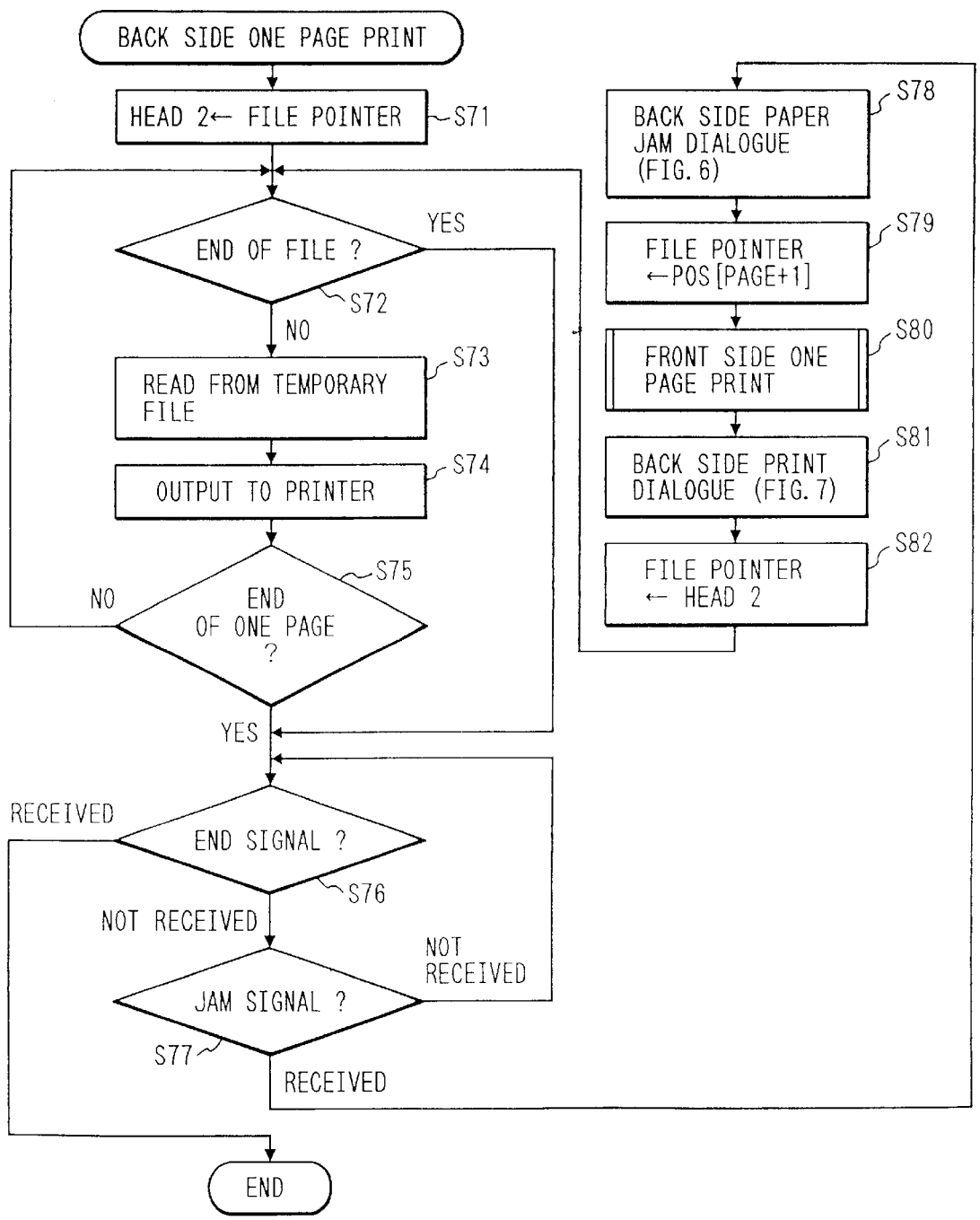
FIG. 12 is a flowchart for explaining a program of the same example.

FIG. 12 is a flowchart showing the details of a both side one page printing process at step S18 as shown in FIG. 19B. If the both side one page process is called, the current value of the file pointer for the temporary file 3 is first stored in the head register HEAD2 at step S71.

Then, at steps S72 to S77, the data transmission to the printer 7, and the print wait after the end of data transmission of one page occur. These processings are identical to those at steps S32 to S37 in FIG. 10. If an END signal 8 is received at step S76, the processing is ended.

If a JAM signal 9 is received at step S77, a screen as shown in FIG. 6 is displayed at step S78. If a line feed key is entered, the operation proceeds to step S79, where the file location stored in the page position table POS[PAGE+1], i.e., the top position of a page next to one currently being printed, is set to the file pointer of the temporary file 3.

Then, the printing of even page printed in the back of a page where the paper jam has occurred is performed in the front side one page printing process at step S80. This processing is identical to that as shown in FIG. 10. Then, at step S81, a screen as shown in FIG. 7 is displayed. If a line feed key is entered, the operation proceeds to step S82, where the file location stored in the page head register HEAD2, i.e., the top position of a page currently being printed, is set to the file pointer for the temporary file 3 at step S71. Then, returning to step S72, data of the page currently being printed is sent to the printer 7 again.

While in the above example the page at which the paper jam has occurred is subjected to the both side printing immediately after the paper jam has occurred, it should be noted that alternatively, other methods may be conceived that, for example, the odd page is only printed when the paper jam occurred, and thereafter the even page is collectively printed, or the printing for the recovery is not performed when the paper jam occurred, and then the both side printing is collectively performed later.

Next, a variation of the above example 1 will be described about only different points from the example 1.

In the variation, when the operation transfers from step S9 to step S13 in FIGS. 9A and 9B (when the printing of even page is ended), a message appearing at step S13 is "PLEASE SET ALL SHEETS OF ONE SIDE PRINTED PAPER TO MP TRAY", instead of the message as shown in FIG. 5. Herein, MP tray indicates a manual insertion tray 219.

And if a line feed key is entered, the driver 5 (host computer 13) sends a command for switching paper feeding means from the paper cassette 210 to the manual insertion tray 219 to the printer 19, and the operation proceeds to step S14. Accordingly, the operator sets a sheet of even page printed paper to the MP tray 219, and enters a line feed key on the keyboard 12, an image of the odd page is printed on the sheet supplied from the MP tray 219.

Note that the operation when the paper jam occurs during printing of one side or even page is the same as in the example 1.

If the paper jam occurs during printing of odd page (when the operation transfers from step S77 to step S78 in FIG. 12), a message as shown in FIG. 4, but not in FIG. 6, appears, and a command for switching paper supply means from the MP tray 219 to the paper cassette 210 is sent to the printer 19.

Accordingly, an image of even page at step S80 is printed on a sheet supplied from the paper cassette 210. If the printing at step S80 is ended, a message appearing at step S81 is "PLEASE SET ONE SIDE PRINTED SHEET OF PAPER TO TOP OF MP TRAY", instead of the message as shown in FIG. 7. And if a line feed key is entered, the driver 5 (host computer 13) sends a command for switching paper feeding means from the paper cassette 210 to the manual insertion tray 219 to the printer 19, and the operation proceeds to step S82.

Further, in this variation, if the judgment at step S17 is affirmative (before starting the printing of last odd page if the number of pages to be printed is odd), the driver 5 (host computer 13) sends a command for switching paper feeding means from the manual insertion tray 219 to the paper cassette 210 to the printer 19. Accordingly, an image of last odd page is printed on the sheet supplied from the paper cassette 210.

While in the above examples the sheet from within the cassette is printed on the lower face, and exhausted with the printed side downward, other printers may be used in which the sheet from the cassette may be printed on the upper face, and/or exhausted with the printed side upward. In this case, to retain the page sequence of printed results, the printing may occur in a different order from the above examples. For example, when using a printer for printing on the upper face of sheet within the cassette and exhausting the sheet with the printer side downward, the page sequence of printed results can be reversed by printing the even page in descending order and the odd page in ascending order.

Also, the data of a page where the paper jam has occurred is not held in the above examples, but alternatively, other printers for holding the data of the page where the paper jam has occurred may be used. In this case, by deleting the page where the paper jam has occurred and whose data is held within the printer, upon a hardware signal or a software command, the processing can be performed in accordance with the same procedure as in the above example, or a procedure of immediately printing the page of the sheet where the paper jam has occurred and whose data is held within the printer.

Also, while in the above examples the page description language is used as print data, it is to be noted that any print data may be employed. Also, while the generation of the temporary file is made by the spooler, and the reading and deletion is made by the driver in the above examples, it is to be noted that other methods may be used, in which for example, no spooler exists and the driver generates the temporary file, or the spooler deletes the temporary file, or the driver performs the reading using a subroutine provided by the spooler, a permanent file is used instead of the temporary file and without deletion.

Also, in the above examples, the application creates the print data, and the spooler receives and writes data to generate the temporary file, but alternatively, any other methods may be used. Also, in the above examples, the print data stored in the temporary file is output to the printer without conversion, but alternatively, the driver may convert the print data stored in the temporary file into the printer language to be output to the printer.

Also, in the above examples, when the number of pages to be printed is odd, no extra page is printed, but alternatively, when the number of pages is odd, extra one page may be printed as a blank sheet. However, it takes more time to print one page for the blank sheet. Also, in the above examples, the generation of the page position table is first made collectively in both side printing, but alternatively, it may be made in sequence during the printing of even page.

Also, in the above examples, the end of page is detected by analyzing the print data during printing, but alternatively, the end of page may be judged as the top position of the next page by referring to the page position table. Also, in the above examples, a page printer was used, but alternatively, any other printers may be used. Also, the END signal and the JAM signal may be on the independent signal line, or sent as the status data via a bi-directional interface such as RS232C, IEEE, or P1284.

Example 2

Figure 13:
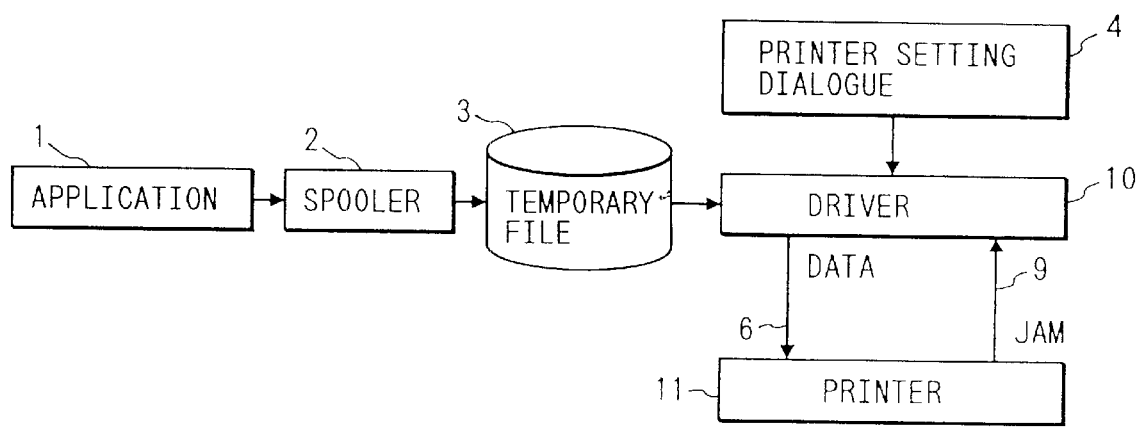
FIG. 13 is a block diagram showing the functional configuration of an output device according to a second example of the present invention.

Referring now to FIGS. 13 to 17, an example 2 will be described below. In FIG. 13, an application 1, a spooler 2, a temporary file 3, a printer setting dialog 4, a DATA signal 6, and a JAM signal 9 are the same as those of the example 1. 10 is a driver for outputting the DATA signal 6 as print data input from the temporary file 3 to a printer 11, and upon receiving the JAM signal 9, performing a predetermined processing. Also, when the both side print is designated by the printer setting dialog 4, the both side printing process is performed.

The printer 11 is a page printer such as a laser beam printer, for printing each page by receiving print data which the driver 10 outputs through the DATA signal 6. Also, when the paper jam occurs during printing, a JAM signal 9 is issued. A specific configuration of the example 2 is equivalent to that of the example 1 and shown in FIGS. 2 and 18.

Next, the outline of a printing procedure in this example 2 will be described. A program of this example 2 is only different in the driver 10 from that of the example 1. If the driver 10 is initiated by the spooler 2, the single side print or the both side print is performed in accordance with the effective state of both side print preset by the printer setting dialog 4. If the both side print is set to be ineffective, the driver 10 sends a page description language stored in the temporary file 3 through the DATA signal 6 to the printer 11.

The processing continues until all the page description language stored in the temporary file 3 has been sent, and if all the transmission has been completed, then the temporary file 3 is deleted and the processing is ended. If a JAM signal 9 is received, the driver 10 displays a screen as shown in FIG. 4, prompting the operator to release the paper jam. If the operator releases the paper jam and enters a line feed key, the driver 10 resumes the transmission of data. It should be noted that the printer 11 is configured to hold data of the page at which the paper jam has occurred, and reprint that page at which the paper jam has occurred. The driver 10 makes the recovery of paper jam in this way, and then continues the processing in the same manner as if no paper jam occurs.

When the both side print is effectively set, data corresponding to the even page is sent to the printer 7 in accordance with the same procedure as the single side print as above described. If all the printing for the even page is completed, the driver 10 displays a screen as shown in FIG. 5. If the operator sets the sheets of one side printed paper for the even page to the cassette of the printer 11 upon an indication on the screen, and enters a line feed key, the driver 10 sends data corresponding to the odd page to the printer 11. The procedure herein is different from that of the single side print as above described, only when the JAM signal 9 is received.

Figure 14:
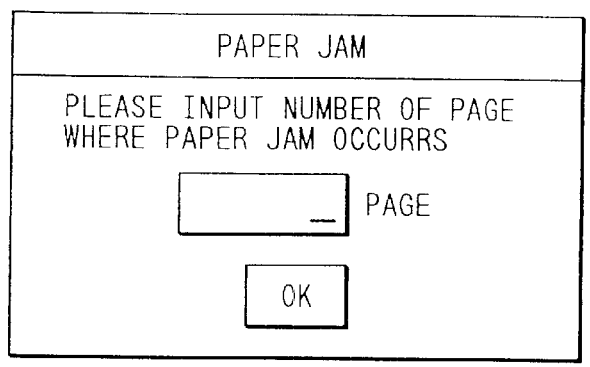
FIG. 14 is a view showing a display screen of the same example.

If a JAM signal 9 is received, the driver 10 displays a screen as shown in FIG. 6. If the operator releases the paper jam, sets a clean sheet of paper to the cassette, and enters a line feed key, a screen as shown in FIG. 14 appears. If the operator inputs the page number at which the paper jam has occurred, and enters a line feed key, the printer performs the reprinting of that page where the paper jam has occurred.

If the printing of all the pages is ended, the page at which the paper jam has occurred and the number of which is entered by the operator is subjected to both side printing. If the operator changes that page by inserting the reprinted page, the complete printed results can be obtained. Note that since the END signal 8 as shown in FIG. 1 does not exist in this example, the page at which the paper jam has occurred can not be detected.

Next, a program for the driver 10 will be described in detail with reference to the flowchart. It is noted in the following description that a both side print register DUP, a page register PAGE, a page position table POS, a print table PT, a last page number register LAST, and page head registers HEAD1 and HEAD2 are arranged on the RAM 16.

Figure 15B:
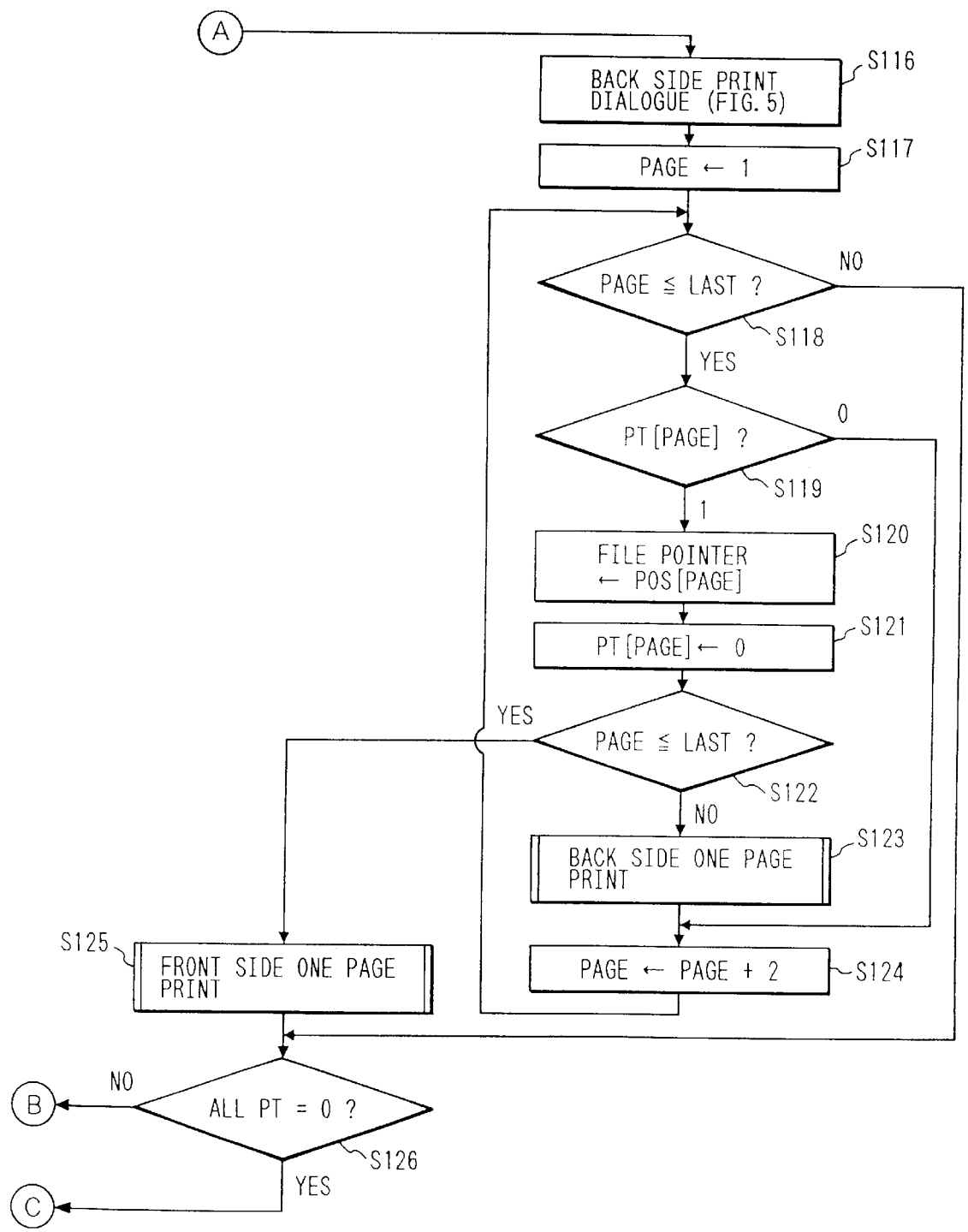

FIGS. 15A and 15B are flowcharts showing the overall printing process for the driver 10. If the driver 10 is initiated, the temporary file 3 is opened at step S101, and the both side print register DUM is examined at step S102. If the both side print is set ineffective, 0 is set in the both side print register DUP by the print setting dialog 4, and therefore the operation proceeds to the front side one page printing process at step S103. At step S103, the page description language stored in the temporary file 3 is read and data of one page is output to the printer 10. If the printing of one page is ended, a check is made to determine whether or not the temporary file 3 reaches the end of file at step S104. If the end of file is not reached, the operation returns to step S103 to print the next one page. In this way, if the printing of all the pages is completed, the operation proceeds from step S4 to step S5 to close the temporary file 3, because the temporary file 3 has reached the end of file. At step S106, the temporary file 3 is deleted, and the processing is ended.

If the both side print is set to be effective, 1 is set in the both side print register DUP by the print setting dialog 4, and the operation proceeds from step S102 to step S107, where all the page description language stored in the temporary file 3 is read and the file location corresponding to the top of each page is recorded in the page position table POS. The page table POS is of an arrangement indexed by the page number, and if the page number is PAGE, the file pointer stored is represented as a POS[PAGE]. At step S107, the last page number is stored in the last page number register LAST.

Then, at step S108, the print page table PT is initialized. The print page table PT is of an arrangement indexed by the page number, and assuming the page number as PAGE, the print page table corresponding to its page number is represented as a POS[PAGE]. The print page table has a setting of 1 for the unprinted page, or 0 for the printed page. Herein, since all the pages are unprinted, PT[1] to PT[LAST] are all set to 1.

Then, at step S109, "2" is stored into the page number register PAGE. Then, at step S110, the page number register PAGE and the last page number register LAST are compared. If PAGE≦LAST, the printing of even page is not ended, and therefore the operation proceeds to step S111 to investigate the print table PT[PAGE]. If PT[PAGE]=0, the printing has been already finished, and the operation proceeds to step S115. If PT[PAGE]=1, the printing has not been yet finished, and the operation proceeds to step S112, where the file pointer of the temporary file 3 is set to POS[PAGE], that is, the file location corresponding to the top of page corresponding to the page number PAGE stored in the page position table POS. Thereby, the subsequent reading from the temporary file 3 occurs in sequence from the set file pointer. Then, "0" is set to the print page table PT[PAGE] at step S113.

Then, the operation proceeds to the front side one page printing process at step S114 to output data of one page to the printer 11. If the printing of one page is ended, "2" is added to the page number register PAGE at step S115, and the operation returns to step S110. In this way, if all the printing of even page is ended, PAGE>LAST results, and the operation proceeds from step S110 to step S116 to display a dialog as shown in FIG. 5. If a line feed key is entered, "1" is stored in the page number register PAGE at step S117.

Then, at step S118, the page number register PAGE and the last page number register LAST are compared. If PAGE≦LAST, the printing of odd page is not ended, and therefore the operation proceeds to step S119 to investigate the print page table PT[PAGE]. If PT[PAGE]=0, the printing has been already finished, and the operation proceeds to step S124. If PT[PAGE]=1, the printing has not been yet finished, and the operation proceeds to step S120, where the file pointer of the temporary file 3 is set to POS[PAGE].

Then, at step S121, "0" is set to the print page table PT[PAGE]. Then, at step S117, the page number register PAGE and the last page number register LAST are compared. If PAGE≠LAST, the page is not last, and therefore the operation proceeds to the back side one page printing process at step S123 to output data of one page to the printer 11. If the printing of one page is ended, "2" is added to the page number register PAGE at step S124, and the operation returns to step S118.

In this way, the printing of odd page is repeated. If the number of pages is even, the operation proceeds from step S118 to step S126, after printing of the last page. If the number of pages is odd, PAGE=LAST occurs at step S122, immediately before printing of the last page, and therefore the operation proceeds to the front side one page printing at step S125 to print the last page, and proceeds to step S126.

At step S126, a check is made to determine whether or not the print page table PT is all equal to "0". Since "0" is set to the print table PT[PAGE] of page to be printed at steps S113 and S121, it is all equal to "0" if no paper jam occurs during printing of the odd page, and the operation proceeds to step S105. If the paper jam occurs in printing the odd page, "1" is set to both the odd page and the even page at which the paper jam has occurred at step S134 in FIG. 16, as will be described later, and the operation returns to step S109 to reprint only the page at which the paper jam has occurred.

Figure 16:
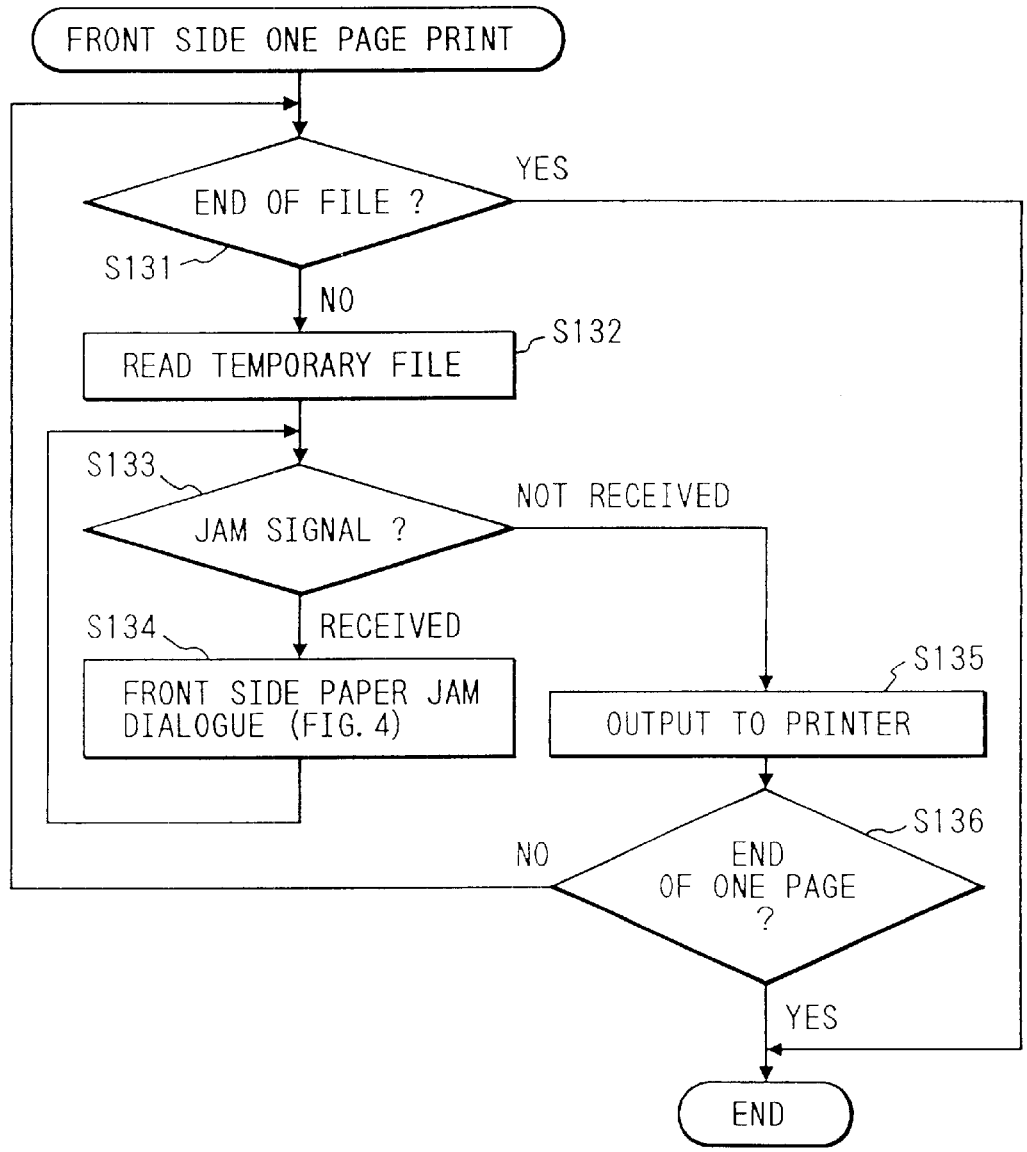
FIG. 16 is a flowchart for explaining a program of the same example.

FIG. 16 is a flowchart showing the details of the front side one page printing process at steps S103, S114, and S125 as shown in FIG. 15B. At step S131, a check is made to see whether or not the temporary file 3 reaches the end of file. If not, the page description language stored is read from the temporary file 3 at step S132.

Then, proceeding to step S133, if a JAM signal 9 is received, a screen as shown in FIG. 4 is displayed at step S134. If a line feed key is entered, the operation proceeds to step S133. If the JAM signal 9 is not received at step S133, the operation proceeds to step S135, where data is sent to the printer 11 through the DATA signal 6.

Then, at step S135, the end of page is checked. Since the data read from the temporary file 3 is the page description language in this example, it can be readily judged by analyzing the read description language. If the end of page is not reached, the operation returns to step S131 to continue the processing. If the end of one page is reached, the processing is ended.

Figure 17:
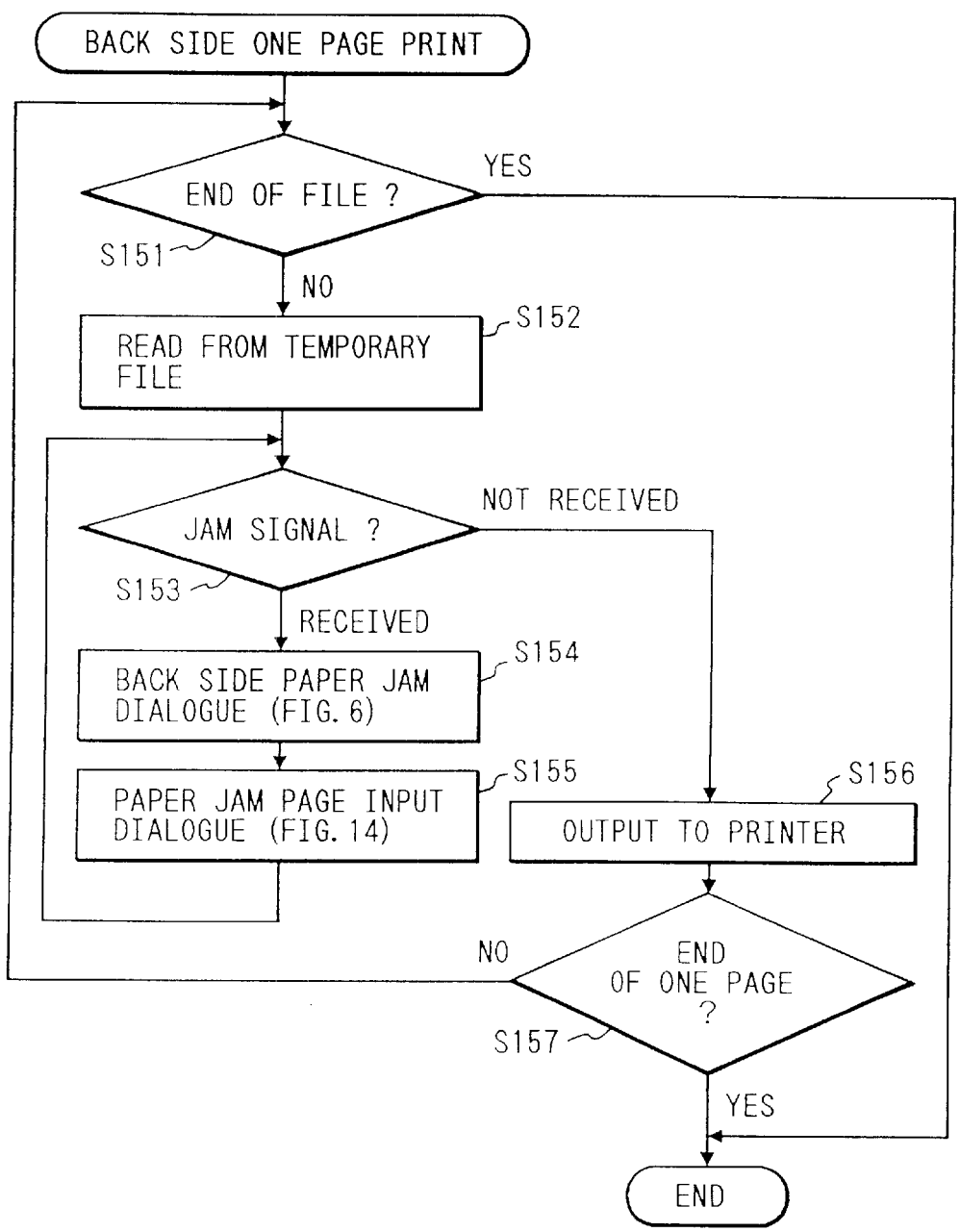
FIG. 17 is a flowchart for explaining a program of the same example.

FIG. 17 is a flowchart showing the details of the back side one page printing process at step S123 as shown in FIG. 15B. If the back side one page printing process is called, a check is made to determine whether or not the temporary file 3 has reached the end of file at step S151. If not, the page description language stored is read from the temporary file 3 at step S152.

Then, proceeding to step S153, if a JAM signal 9 is received, a screen as shown in FIG. 6 is displayed at step S154. If a line feed key is entered, the operation proceeds to step S155, where a screen as shown in FIG. 14 is displayed. If the page number is input and a line feed key is entered, "1" is set to a page corresponding to the input number of the print page table PT, and a back page thereof. Specifically, if the input number P is odd, "1" is set to PT[P] and PT[PT+1], or if it is even, "1" is set to PT[PT−1] and PT[P]. Then, the operation returns to step S153.

If the JAM signal 9 is not received at step S153, the operation proceeds to step S156, where data is sent to the printer 11 through the DATA signal 6. Then, at step S157, a check is made to determine whether or not the end of page is reached. If the end of page is not reached, the operation returns to step S151 to continue the processing. If the end of page is reached, the processing is ended.

As above described, according to the present invention, it is possible to provide an output device which is capable of readily effecting the appropriate recovery of paper jam in the both side printing in the manner to reproduce data printed on the sheet where the paper jam has occurred, using a printer without having a both side printing mechanism.

While in the above examples 1 and 2, the sheet from within the cassette is printed on the lower face, and exhausted with the printed side downward, other printers may be used in which the sheet from the cassette may be printed on the upper face, and/or exhausted with the printed side upward. In this case, to retain the page sequence of printed results, the printing may occur in a different order from the above examples. For example, when using a printer for printing on the upper face of sheet within the cassette and exhausting the sheet with the printer side downward, the page sequence of printed results can be reserved by printing the even page in descending order and the odd page in ascending order.

Also, the data of a page where the paper jam has occurred is not held in the above examples, but alternatively, other printers for holding the data of the page where the paper jam has occurred may be used. In this case, by deleting the page where the paper jam has occurred and whose data is held within the printer, upon a hardware signal or a software command, the processing can be performed in accordance with the same procedure as in the above example, or a procedure of immediately printing the page of the sheet where the paper jam has occurred and whose data is held within the printer.

Also, while in the above examples the page description language is used as print data, it is to be noted that any print data may be employed. Also, while the generation of the temporary file is made by the spooler, and the reading and deletion is made by the driver in the above examples, it is to be noted that other methods may be used, in which for example, no spooler exists and the driver generates the temporary file, or the spooler deletes the temporary file, or the driver performs the reading using a subroutine provided by the spooler, a permanent file is used instead of the temporary file and without deletion.

Also, in the above examples, the application creates the print data, and the spooler receives and writes data to generate the temporary file, but alternatively, any other methods may be used. Also, in the above examples, the print data stored in the temporary file is output to the printer without conversion, but alternatively, the driver may convert the print data stored in the temporary file into the printer language to be output to the printer.

Also, in the above examples, when the number of pages to be printed is odd, no extra page is printed, but alternatively, when the number of pages is odd, extra one page may be printed as a blank sheet. However, it takes more time to print one page for the blank sheet. Also, in the above examples, the generation of the page position table is first made collectively in both side printing, but alternatively, it may be made in sequence during the printing of even page.

Also, in the above examples, the end of page is detected by analyzing the print data during printing, but alternatively, the end of page may be judged as the top position of the next page by referring to the page position table. Also, in the above examples, a page printer was used, but alternatively, any other printers may be used. Also, the END signal and the JAM signal may be on the independent signal line, or sent as the status data via a bi-directional interface such as RS232C, IEEE, or P1284.

Furthermore, in the above examples, the printing of next page is not started until the printing of one page is ended, but the printing of next page may be started before the printing of one page is ended. In that case, the printers 7, 11 recognize the sheet number which is defective due to the jam (the page number which has been sent from the host computer but abnormally printed), based on the jam detection timing. In the example 1, the data for such sheet number is sent from the printer 7 to the host computer (driver), which then resends data of the page preceded by the sheet number (which is different between the single side printing and the both side printing).

Also, in the example 2, when $\alpha$ sheets are defective due to the jam in the back side printing, for example, the first page (odd) P which has been lost due to the jam is entered from the keyboard, and PT[P] to PT[P+2x$\alpha$−1] is set at 1.

The present invention is not limited to the above-described examples, but various variations may be made within the scope of the attached claims.

What is claimed is:

1. A method of outputting print data from an external apparatus to a printer via a predetermined interface, the printer having a plurality of sheet feeding means including a first and a second sheet feeding means, comprising the steps of:

a first output step of outputting data of even pages to be printed on one side of respective recording media set in the first sheet feeding means;

a second output step of outputting a first instruction to change from the first sheet feeding means to the second sheet feeding means and outputting data of odd pages, except for a last page if the last page is an odd page, to be printed on the other side of the respective recording media set in the second sheet feeding means by an operator; and a third output step of outputting a second instruction to change from the first sheet feeding means to the second sheet feeding means and outputting data of the last page to be printed on a recording medium set in the second sheet feeding means, if the last page is an odd page, wherein said third output step is performed automatically after said second output step is performed.

2. A method according to claim 1, further comprising the step of storing print data generated by print data generating means in storage means to be identifiable for each page.

3. A method according to claim 1, further comprising a display step of displaying after said first printing step, a message for allowing the operator to set the recording media on one side of which the data of the even pages were printed in the second sheet feeding means.

4. A method according to claim 1, wherein print data is described in page description language.

5. A print control apparatus for outputting print data from an external apparatus to printing means via a predetermined interface, the printer having a plurality of sheet feeding means including a first and a second sheet feeder, said apparatus comprising:

means for outputting print data to the printing means to output data of even pages to be printed on one side of respective recording media set in the first sheet feeder;

means for outputting a first instruction to change from the first sheet feeding means to the second sheet feeding means and outputting print data to the printing means to output data of odd pages to be printed, except for a last page if the last page is an odd page, to be printed on the other side of the respective recording media set in the second sheet feeding means by an operator; and means for outputting a second instruction to change from the first sheet feeding means to the second sheet feeding means and outputting data of the last page to be printed on a recording medium set in the second sheet feeder, if the last page is an odd page, wherein said instruction to change is output automatically after said data of odd pages to be printed is output.

6. An apparatus according to claim 5, further comprising storage means for storing print data generated by print data generating means to be identifiable for each page.

7. An apparatus according to claim 5, further comprising a display step of displaying after said first printing step, a message for allowing the operator to set the recording media on one side of which data of the even pages is performed using the second sheet feeder.

8. An apparatus according to claim 5, further comprising said printing means, said printing means being an electro-photographic printer without having a both side printing mechanism.

9. A recording medium usable with a computer, which stores a program code readable by the computer, said program code outputting print data from an external apparatus to a printer via a predetermined interface, the printer having a plurality of sheet feeding means including a first and a second sheet feeding means and comprising the steps of:

a first output step of outputting data of even pages to be printed on one side of respective recording media set in the first sheet feeding means;

a second output step of outputting a first instruction to change from the first sheet feeding means to the second sheet feeding means and outputting data of odd pages, except for a last page if the last page is an odd page to be printed, on the other side of the respective recording media set in the second sheet feeding means by an operator; and a third output step of outputting a second instruction to change from the first sheet feeding means to the second sheet feeding means and outputting data of the last page to be printed on a recording medium set in the second sheet feeding means, if the last page is an odd page, wherein said third output step is performed automatically after said second output step is performed.

10. A recording medium according to claim 9, wherein said program code further comprises means for storing print data generated by print data generating means in storage means to be identifiable for each page.

11. A recording medium according to claim 9, further comprising a display step of displaying after said first printing step, a message for allowing the operator to set the recording media on one side of which data of the even pages were printed in the second sheet feeding means.

12. A recording medium according to claim 9, wherein said recording medium is any one of floppy disk and CD-ROM.

* * * * *

UNITED STATES PATENT AND TRADEMARK OFFICE
CERTIFICATE OF CORRECTION

PATENT NO. : 6,377,356 B2
DATED : April 23, 2002
INVENTOR(S) : Yoichi Sakamoto et al.

It is certified that error appears in the above-identified patent and that said Letters Patent is hereby corrected as shown below:

<u>Drawings,</u>
Figure 14, "OCCURRS" should read -- OCCURS --.

<u>Column 1,</u>
Line 20, "(so-called a" should read -- (a so-called --.

<u>Column 3,</u>
Line 62, "diaphragm," should read -- diaphragm -- and "not shown." should read -- (not shown). --.
Line 66, "means, not shown," should read -- means (not shown), --.

<u>Column 4,</u>
Line 2, "registrating" should read -- registering --.
Line 6, "most upper" should read -- uppermost --.
Line 18, "holder, not shown." should read -- holder (not shown), --.
Line 22, "laser, not shown," should read -- laser (not shown), --.
Line 37, "motor, not shown," should read -- motor (not shown), --.

<u>Column 6,</u>
Line 18, "driver 5 is" (1$^{st}$ occurrence) should be deleted.

<u>Column 10,</u>
Line 15, "extra one" should read -- one extra --.

<u>Column 12,</u>
Lines 17 and 40, "been yet" should read -- yet been --.

<u>Column 14,</u>
Line 30, "extra one" should read -- one extra --.

Signed and Sealed this

Eighteenth Day of March, 2003

JAMES E. ROGAN
*Director of the United States Patent and Trademark Office*